(12) United States Patent
Martyn

(10) Patent No.: US 11,713,798 B2
(45) Date of Patent: Aug. 1, 2023

(54) APPARATUS FOR CONVERTING MOTION

(71) Applicant: Ten Fold Engineering Limited, Buckinghamshire (GB)

(72) Inventor: David Martyn, Wallingford (GB)

(73) Assignee: Ten Fold Engineering Limited, Buckinghamshire (GB)

( * ) Notice: Subject to any disclaimer, the term of this patent is extended or adjusted under 35 U.S.C. 154(b) by 21 days.

(21) Appl. No.: 17/558,229

(22) Filed: Dec. 21, 2021

(65) Prior Publication Data
US 2022/0112939 A1 Apr. 14, 2022

Related U.S. Application Data

(63) Continuation of application No. 16/443,590, filed on Jun. 17, 2019, now Pat. No. 11,248,685.

(30) Foreign Application Priority Data

Jun. 18, 2018 (GB) .................................. 1809975

(51) Int. Cl.
*F16H 21/44* (2006.01)
*F16C 7/02* (2006.01)
*F16C 11/04* (2006.01)

(52) U.S. Cl.
CPC ............... *F16H 21/44* (2013.01); *F16C 7/02* (2013.01); *F16C 11/04* (2013.01)

(58) Field of Classification Search
CPC ................................ F16H 21/04; F16H 21/44
USPC ...................................................... 74/49, 103
See application file for complete search history.

(56) References Cited

U.S. PATENT DOCUMENTS

| 428,476 | A | 5/1890 | Gastrell |
| 1,190,215 | A | 7/1916 | Beckner |
| 2,070,941 | A | 2/1937 | Dust |
| 2,508,151 | A | 5/1950 | Hoven et al. |
| 2,529,451 | A | 11/1950 | Hoven et al. |

(Continued)

FOREIGN PATENT DOCUMENTS

| CN | 102678861 B | 9/2012 |
| GB | 488626 A | 7/1938 |

(Continued)

OTHER PUBLICATIONS

Patents Act 1977: Search Report under Section 17, GB Application No. 1809980.4, dated Dec. 6, 2018, 1 page.

(Continued)

*Primary Examiner* — Jake Cook

(57) ABSTRACT

An assembly for converting motion comprises a first arm rotatable at a first position about a first fixed pivot; a second arm rotatable at a first position about a second fixed pivot; a third arm linked at a first position to the second arm at a second position on the second arm, the third arm being linked at a second position to the first arm at a second position on the first arm; wherein one of the first and second positions on the third arm is moveable and the other of the first and second positions is fixed relative to the third arm; and a connecting arm extending between the first arm and the second arm, the connecting arm pivotably connected at a first position to a third position on the first arm and pivotably connected at a second position to the second position on the second arm.

20 Claims, 11 Drawing Sheets

(56) References Cited

U.S. PATENT DOCUMENTS

| | | | |
|---|---|---|---|
| 3,312,980 | A | 4/1967 | Erbach |
| 4,030,379 | A | 6/1977 | Colinet |
| 4,248,103 | A | 2/1981 | Halsall |
| 4,249,427 | A | 2/1981 | Colinet et al. |
| 4,400,984 | A | 8/1983 | Ronbeck |
| 4,490,985 | A | 1/1985 | Wells |
| 4,530,637 | A | 7/1985 | Mason et al. |
| 4,635,493 | A | 1/1987 | Buckley |
| 4,747,353 | A | 5/1988 | Watt |
| 5,102,290 | A | 4/1992 | Cipolla |
| 5,182,961 | A * | 2/1993 | Menahem ............. G05G 9/047 244/234 |
| 5,237,887 | A | 8/1993 | Appleberry |
| 2014/0260737 | A1 | 9/2014 | Smith et al. |
| 2016/0195175 | A1 | 7/2016 | Martyn |

FOREIGN PATENT DOCUMENTS

| | | |
|---|---|---|
| GB | 2517920 A | 3/2015 |
| KR | 101883970 B1 | 8/2018 |
| WO | 9733725 A1 | 9/1997 |
| WO | 9914018 A1 | 3/1999 |
| WO | 2013182834 A1 | 12/2013 |
| WO | 2015033111 A1 | 3/2015 |

OTHER PUBLICATIONS

Dijksman, E.A., "True Strail-line Linkages Having a Rectilinear Translating Bar", Advances in Robot Kinematics and Computationed Geometry, pp. 411-420. 1994, Kluwer Academic Publishers.
Patents Act 1977: Search Report under Section 17, GB Application No. 1809971.3, dated Nov. 26, 2018, 1 page.
Office action restriction requirement in U.S. Appl. No. 16/443,590, filed Jun. 17, 2019, dated Apr. 28, 2021, 5 pages.
Response to office action restriction requirement in U.S. Appl. No. 16/443,590, filed Jun. 17, 2019, dated Jun. 28, 2021, 9 pages.
Office acton in U.S. Appl. No. 16/443,590, filed Jun. 17, 2019, dated Jul. 6, 2021, 14 pages.
Response to office action in U.S. Appl. No. 16/443,590, filed Jun. 17, 2019, dated Oct. 4, 2021, 24 pages.

* cited by examiner

APPARATUS FOR CONVERTING MOTION

The present invention relates to an apparatus for converting motion. In one aspect, the apparatus may be used to producing a straight line motion, in particular an apparatus for producing motion of a component in a straight line generated by the rotational movement of a second component or the motion of the second component about a pivot. In a further aspect, the apparatus may be used to both displace and rotate a first component with respect to a second component.

Mechanisms for converting motion, in particular producing a straight line motion from a rotational motion are known in the art. Such straight line mechanisms may be characterised by comprising a first member rotatable about an axis passing through the member and a second member linked to or associated with the first member, the arrangement being such that rotational movement of the first member about the axis results in a straight line movement of the second member.

Examples of early mechanisms for producing a straight line motion include the straight line mechanism design by James Watt, comprising a series of three levers in end-to-end configuration, with movement of the two end levers about pivots at their free ends causing the middle lever to follow a close approximation to a straight line over a portion of its movement. A related linkage comprising three levers, with the middle lever constrained to follow a straight line was proposed by Tchebicheff. The Peaucellier-Lipkin inversor consists of an arrangement of seven levers and provides a conversion of circular motion into linear motion and vice versa. A related four-lever mechanism was proposed by Hart. A linear converter, known as the half beam mechanism, in which a first linear motion is converted to a second linear motion perpendicular to the first, was designed by Scott Russell.

An analysis of a variety of multi-lever, straight line linkages is provided by Dijksman, E. A. 'Advances in Robot Kinematics and Computationed Geometry', pages 411 to 420, [1994] Kluwer Academic Publishers.

U.S. Pat. No. 4,248,103 discloses a straight line mechanism, in particular a mechanism of the so-called 'conchoid' type. There is disclosed a linkage mechanism for an industrial manipulator comprising at least two of the said straight line mechanisms.

U.S. Pat. No. 4,400,985 concerns a straight line link mechanism, comprising a plurality of pivotally connected links. The links are connected between a support and a controlled member. As one of the links is moved in a 360° arc, the controlled member alternately moves in a first direction along a linear path and thereafter in the opposite direction along a curved path. The weight of the controlled member may be balanced by the use of a counter weight, to provide a lifting mechanism. A cam may be employed to control the motion of the controlled member.

More recently, U.S. Pat. No. 4,747,353 discloses a straight line motion mechanism formed from a pair linkage mechanisms arranged in a parallelogram in combination with a motion control means. The motion control means interconnects the two linkage mechanisms and provide a uniform angular displacement of each linkage mechanism.

U.S. Pat. No. 5,102,290 concerns a transfer device for transferring a workpiece from a first location to a second location. The workpiece is moved in a trochoidal arc by means of a pickup arm mounted to roll along a flat surface.

A straight line mechanism is disclosed in U.S. Pat. No. 5,237,887. The mechanism comprises a static base and a platform supported by first and second arm assemblies. Each of the first and second arm assemblies comprises portions pivotally connected to the static base. The arrangement of the pivoted arm portions of each arm assembly is such that the platform is constrained to move in a straight line, as the portions of the arms move about their respective pivot connections.

Still more recently, WO 97/33725 discloses a device for the relative movement of two elements. The device comprises at least two first links connected to a first element by a hinged connection so as to form a four-hinge system and pivot in a plane parallel to the plane of the first element. At least two second links are connected to the second element so as to form a four-hinge system and to pivot in a plane parallel to the plane of the second element. The two four-hinge systems provided by the first and second links are coupled in series to allow relative motion of the first and second elements.

WO 99/14018 discloses a device for the relative movement of two elements. The device comprises at least two link devices coupled between the elements, each comprising two mutually articulated link units. A first link unit is connected to first, moveable element. The second of the link units is connected to the second, static element. Power applied to the link units causes the first element to move relative to the second.

A mechanical linkage is described and shown in U.S. Pat. No. 2,506,151. The linkage comprises a plurality of interconnected levers. The linkage provides for movement of one member with respect to a fixed member. The linkage is specifically described and shown for use in providing movement for components of a chair, in particular to allow for movement of the seat of the chair in a rearwardly-downwardly and forwardly-upwardly direction. The linkage is indicated in U.S. Pat. No. 2,506,151 to provide for movement of the moveable member in a straight path with respect to the fixed member. A similar mechanical linkage is disclosed in U.S. Pat. No. 2,529,451.

An assembly for converting a rotary motion into a straight line motion has been found by the present inventors, which relies upon an assembly of five levers or arms having pivoted connections therebetween. This assembly is the subject of WO 2013/182834. A further assembly of this kind is disclosed by the present inventors in WO 2015/033111.

There is a continuing need for an improved assembly for providing an element moveable in response to a rotational motion. It would be most advantageous if the assembly could be arranged to be able to deploy a supporting member when being moved from a retracted position to an extended position.

According to the present invention, there is provided an assembly for converting motion, the assembly comprising:
a first arm rotatable at a first position on the first arm about a first fixed pivot;
a second arm rotatable at a first position on the second arm about a second fixed pivot, the second fixed pivot spaced apart from the first fixed pivot;
a third arm linked at a first position on the third arm to the second arm at a second position on the second arm, the second position on the second arm spaced apart from the first position on the second arm, the third arm being linked at a second position on the third arm to the first arm at a second position on the first arm, the second position on the first arm spaced apart from the first position on the first arm, wherein one of the first and second positions on the third arm is moveable relative to the third arm and the other of the first and second positions on the third arm is fixed relative to the third arm; and a connecting arm extending between the first arm and the second arm, the connecting arm pivotably connected at a first position on the connecting arm to a third position on the first arm spaced apart from the first and second positions on the first arm and pivotably connected at a second position on the connecting arm to the second position on the second arm.

In use, the assembly is moveable between a retracted position and an extended position. In operation of the assembly, rotation of the first arm about the first fixed pivot results in rotation of the second arm about the second fixed pivot and movement of the third arm. At the same time, the third arm is moved either away from or towards the fixed pivots, depending upon the direction of rotation of the first and second arms.

The assembly of the present invention may be arranged such that the arms of the assembly are accommodated one within the other in a very compact configuration, for example all lying between the first and second fixed pivots, when in the retracted position. This compactness is a significant advantage of the assembly of this invention.

The third arm may be arranged to be moved or deployed as the assembly is moved to the extended position, in which the third arm provides support for the assembly and/or another component connected to and being moved by the assembly. It is particularly advantageous that the third arm is deployed as a support arm simultaneously as the assembly is moved to the extended position. For example, the support arm may form or comprise part of a leg assembly that is deployed as the assembly is moved to the extended position, thereby allowing the assembly and any components or structure connected thereto to be supported automatically, as the assembly is moved from the retracted position to the extended position.

The assembly has been defined hereinbefore by reference to a plurality of arms. It is to be understood that the term 'arm' is used as a general reference to any component that may be connected as hereinbefore described and/or moved about a fixed pivot. Accordingly, the term 'arm' is to be understood as being a reference to any such component, regardless of shape or configuration.

As noted, operation of the assembly results in motion of the third arm. It is to be understood that the assembly may be used to convert a rotational motion of the first and/or second arms about the first or second fixed pivots into a motion of the third arm, that is by having drive to the assembly provided at the first and/or second arms. Alternatively, the assembly may be used to convert a motion of the third arm into a rotational motion of the first and second arms, that is by having drive to the assembly applied at the third arm.

As described in more detail below, the assembly of the present invention is fixed in use to a first fixed pivot and a second fixed pivot. In this respect, the term 'fixed pivot' is a reference to a pivot that has its position fixed, with respect to the arms of the assembly and any component attached or mounted to the arms, which are moveable relative to the fixed pivot. The first and second fixed pivots are provided by a structure or component and are points at which the assembly is mounted to the structure or component.

The first and second fixed pivots have their positions fixed relative to each other, that is the position of the first fixed pivot is fixed relative to the position of the second fixed pivot.

The first and second fixed pivots may be arranged in any orientation, relative to one another, as determined by the action required of the assembly. The first and second fixed pivots lie on a straight line. In many embodiments, the first and second fixed pivots are arranged on a vertical straight line.

In operation of the assembly, the arms of the assembly can be arranged to move in a plane containing the line joining the first and second fixed pivots. This is particularly advantageous.

In addition, the arms of the assembly can be arranged to lie and move to one side only of the line joining the first and second fixed pivots. Again, this is particularly advantageous in many embodiments, as it allows the assembly to be mounted and operate on just one side of the first and second fixed pivots, without encroaching on the space on the opposing side of the first and second fixed pivots.

The assembly of the present invention comprises a first arm. The first arm may have any shape and configuration. A preferred form for the first arm is an elongate member, for example a bar or a rod. The first arm is pivotably mounted at a first position on the first arm to the first fixed pivot.

The pivotable connection at the first position may be of any suitable form, preferably a pin, spindle or axle passing through the arm about which the arm is free to move.

The first position may be in any suitable location on the arm. In one preferred embodiment, the first position is at or adjacent one end of the arm.

The first arm may function as a driving arm for the assembly, that is have a force applied thereto so as to rotate the arm about the fixed pivot at the first position on the arm, thereby transferring drive to the other components of the assembly. Alternatively, the first arm may be a driven arm of the assembly, that is move about the fixed pivot under the action of the other components of the assembly. In many embodiments, the first arm operates as a driving arm.

The first position on the first arm may be at any suitable location thereon. In one preferred embodiment, the first position is at or adjacent the first end of the first arm.

The assembly further comprises a second arm. The second arm may have any shape and configuration. A preferred form for the second arm is an elongate member, for example a bar or a rod. The second arm is pivotably mounted at a first position on the second arm to a second fixed pivot.

The pivotable connection at the first position may be of any suitable form, preferably a pin, spindle or axle passing through the arm about which the arm is free to move.

The first position may be in any suitable location on the second arm. In one preferred embodiment, the first position is at or adjacent one end of the second arm.

The second arm may function as a driving arm for the assembly, that is have a force applied thereto so as to rotate the arm about the fixed pivot at the first position on the arm, thereby transferring drive to the other components of the assembly. Alternatively, the second arm may be a driven arm of the assembly, that is move about the fixed pivot under the action of the other components of the assembly. In many embodiments, the second arm operates as a driving arm.

The assembly further comprises a third arm. The third arm may have any shape and configuration. A preferred form for the third arm is an elongate member, for example a bar or a rod.

The third arm is linked at a first position on the third arm to the second arm at a second position on the second arm. The first position on the third arm may be fixed or may be moveable relative to the third arm. The term 'linked' as used herein is a reference to the type of connection between the third arm and the second arm. In particular, the term 'linked' refers to a first type of connection between the third arm and the second arm in which the first position on the third arm is fixed in relation to the third arm. The term 'linked' also refers to a second type of connection between the third arm and the second arm, in which the second arm is connected to the third arm such that the first position on the third arm is moveable along the third arm as the assembly moves between the retracted and extended positions.

In one embodiment, in which the first position on the third arm is moveable, the third arm is linked to the second arm such that the second position on the second arm both pivots in relation to the third arm and moves along a straight line parallel to the longitudinal axis of the third arm. Preferably, in this embodiment, the second position on the second arm is pivotably connected to the third arm and moves along the third arm, more preferably along the longitudinal axis of the third arm. For example, the second position on the second arm may be pivotably connected to the first position on the third arm, such as by means of a pin, spindle or axle, and the first position on the third arm is moveable along a slot in the third arm.

In an alternative embodiment, the first position on the third arm is fixed relative to the third arm and the third arm is pivotably connected at the first position to the second position on the second arm. The pivotable connection between the second and third arms may be of any suitable form, preferably a pin, spindle or axle passing through the arms about which one or both of the arms are free to move.

The third arm is linked to the second arm at a first position on the third arm and a second position on the second arm. The first position on the third arm may be in any suitable location on the third arm. In one preferred embodiment in which the first position on the third arm is fixed, the first position is at or adjacent one end of the third arm.

The second position on the second arm is spaced apart from the first position on the second arm and the second fixed pivot. In one preferred embodiment, the second position on the second arm is at or adjacent the second or distal end of the second arm, that is the end farthest from the second fixed pivot.

In addition to being linked to the second arm, the third arm is linked to the first arm at a second position on the first arm. The second position on the first arm is spaced apart from the first position on the first arm and the first fixed pivot. In one preferred embodiment, the second position on the first arm is at or adjacent an end of the first arm, in particular the distal end of the first arm, that is the end farthest from the first fixed pivot.

As noted above, the third arm is linked at a second position on the third arm to the first arm. The second position on the third arm may be fixed or may be moveable relative to the third arm. The term 'linked' as used herein is a reference to the type of connection between the third arm and the first arm. In particular, the term 'linked' refers to a first type of connection between the third arm and the first arm in which the second position on the third arm is fixed in relation to the third arm. The term 'linked' also refers to a second type of connection between the third arm and the first arm, in which the first arm is connected to the third arm such that the second position on the third arm is moveable along the third arm as the assembly moves between the retracted and extended positions.

In one embodiment, in which the second position on the third arm is moveable, the third arm is linked to the first arm such that the second position on the first arm both pivots in relation to the third arm and moves along a straight line parallel to the longitudinal axis of the third arm. Preferably, in this embodiment, the second position on the first arm is pivotably connected to the third arm and moves along the third arm, more preferably along the longitudinal axis of the third arm. For example, the second position on the first arm may be pivotably connected to the second position on the third arm, such as by means of a pin, spindle or axle, and the second position on the third arm is moveable along a slot in the third arm.

In an alternative embodiment, the second position on the third arm is fixed relative to the third arm and the third arm is pivotably connected at the second position to the second position on the first arm. The pivotable connection between the first and third arms may be of any suitable form, preferably a pin, spindle or axle passing through the arms about which one or both of the arms are free to move.

The assembly further comprises a connecting arm. The connecting arm extends between the first arm and the second arm. The connecting arm may have any shape and configuration. A preferred form for the connecting arm is an elongate member, for example a bar or a rod.

The connecting arm is pivotably mounted to each of the first and second arms. The pivotable connections between the connecting arm and each of the first and second arms may be of any suitable form, preferably a pin, spindle or axle passing through the arms about which one or both of the arms are free to move.

The pivotable connections may be at any suitable location on the connecting arm. In one preferred embodiment, the pivotable connection between the connecting arm and the first arm is at or adjacent one end of the connecting arm and/or the pivotable connection between the connecting arm and the second arm is at or adjacent the second end of the connecting arm. In other embodiments, the connecting arm extends beyond the connection with the first arm, for example to provide a way to limit the movement of the assembly and/or lock the assembly.

The connecting arm is connected to the first arm at a third position on the first arm. The third position on the first arm is spaced apart from the first and second positions on the first arm, in particular is between the first and second positions on the first arm.

The connecting arm is further connected to the second arm at the second position on the third arm.

In the assembly, one of the first and second positions on the third arm is fixed and the other of the first and second positions on the third arm is moveable, as described above.

In operation of the embodiment in which the first position on the third arm is fixed and the second position on the third is moveable relative to the third arm, as the assembly moves between the retracted and extended positions, the second position on the first arm pivots in relation to the third arm and moves longitudinally with respect to the third arm, while the third arm pivots about the connection with the second arm. More preferably, in operation, the second position on the first arm pivots with respect to the third arm and moves longitudinally along the third arm.

In operation of the embodiment in which the second position on the third arm is fixed and the first position on the third is moveable relative to the third arm, as the assembly moves between the retracted and extended positions, the first position on the first arm pivots in relation to the third arm and moves longitudinally with respect to the third arm, while the third arm pivots about the connection with the first arm. More preferably, in operation, the second position on the second arm pivots with respect to the third arm and moves longitudinally along the third arm.

In one preferred embodiment, the assembly comprises a guide connected to the third arm and with which the first arm or the second arm is engaged and along which the second position on the first or second arm travels as the assembly moves between the retracted and extended positions. The guide may be spaced apart from but mounted to the third arm. More preferably, the guide is formed on the third arm. In one preferred embodiment, the guide comprises a guide channel, more preferably a guide channel extending longitudinally along the third arm. In one particularly preferred embodiment, the guide channel extends along the longitudinal axis of the third arm.

The extent of movement of the assembly from the retracted position to the extended position may be limited by means limiting the movement of the second position of the first arm or the second arm with respect to the third arm. For example, in embodiments with a guide, the guide may comprise a stop to limit the movement of the second position on the first arm or the second arm. In embodiments in which the guide comprises a guide channel, the stop may be provided by an end of the channel.

The movement of the assembly, and hence the third arm, may be limited as required. In particular, the movement of the assembly may be limited to have the third arm deployed at any suitable angle, relative to the other components of the assembly and the line joining the first and second fixed pivots. It is particularly advantageous that the third arm may be arranged to have its longitudinal axis extending substantially parallel to the line joining the first and second fixed pivots, when the assembly is in the extended position. It is preferred that the movement of the assembly towards the extended position is limited, as discussed above, to prevent the assembly moving beyond this extended position. This arrangement is particularly advantageous when the third arm is being employed as a support member for the assembly and/or one or more components connected to the assembly. For example, this arrangement is advantageous when the third arm is being deployed and employed as a leg and the leg is required to be arranged vertically when the assembly is in the extended position.

Other means to limit the movement of the assembly from the retracted position to the extended position may be provided, either as an alternative to the arrangement discussed above or in addition thereto. For example, in one embodiment, the connecting arm may extend beyond the connection with the first arm towards the line joining the first and second fixed pivots. The end of the connecting arm may be arranged to engage with the structure providing the first and second fixed pivots, for example to abut a stop and/or to engage with a lock assembly.

The distance between the first and second fixed pivots and the lengths of the first, second and third arms may be selected according to the desired movement of the components to be achieved and the particular application of the assembly.

However, generally, the ratio of the length of the first arm, that is the distance between the first and second positions on the first arm, to the distance between the first and second fixed pivots may range from 0.5 to 2.0, more preferably from 0.6 to 1.75, still more preferably from 0.75 to 1.5. The first arm is preferably no longer than the distance between the first and second fixed pivots. The first arm may be shorter than the distance between the first and second fixed pivots. The ratio of the length of the first arm to the distance between the first and second fixed pivots is therefore more preferably from 0.75 to 1.0, still more preferably from 0.8 to 1.0, in particular from 0.9 to 1.0. A ratio of about 0.92 to about 1.0 is particularly suitable for many applications. In many preferred embodiments, the length of the first arm is substantially the same as the distance between the first and second fixed pivots.

The ratio of the length of the second arm, that is the distance between the first and second positions on the second arm, to the distance between the first and second fixed pivots may range from 0.5 to 2.0, more preferably from 0.6 to 1.75, still more preferably from 0.75 to 1.5. The second arm is preferably no longer than the distance between the first and second fixed pivots. The second arm may be shorter than the distance between the first and second fixed pivots. The ratio of the length of the second arm to the distance between the first and second fixed pivots is therefore more preferably from 0.75 to 1.0, still more preferably from 0.8 to 1.0, in particular from 0.9 to 1.0. A ratio of about 0.92 to about 1.0 is particularly suitable for many applications. In many preferred embodiments, the length of the second arm is substantially the same as the distance between the first and second fixed pivots.

The second arm may be longer or shorter than the first arm. In one preferred embodiment, the first and second arms are of the same length.

The third arm may have any suitable length, for example determined by the support function to be performed by the third arm. The third arm may be longer than either one or both of the first and second arms. In some embodiments, the length of the third arm is less than that of the first and second arms. In alternative embodiments, the length of the third arm is the same as that of the first arm and/or the second arm. The third arm may be shorter than the distance between the first and second fixed pivots, may have a length equal to the distance between the first and second fixed pivots, or may be longer than the distance between the first and second fixed pivots.

In one embodiment, the first, second and third arms are substantially the same length.

The length of the third arm may be variable. In particular, the length of the third arm may vary as the assembly moves between the retracted position and the extended position. In many preferred embodiments, the length of the third arm increases as the assembly moves from the retracted position to the extended position. For example, the third arm may comprise a plurality of arm components moveable longitudinally with respect to each other, such as being telescopically arranged.

The connecting arm may have any suitable length. The length of the connecting arm may be confined to the distance between the positions on the first and third arms between which the connecting arm extends. Alternatively, the connecting arm may extend beyond either one or both of the first and third arms, as described above, for example to provide additional support, in particular when the assembly is in the extended position, and/or to provide a locking action to limit movement of the assembly. For example, the connecting arm may extend beyond either one or both of the first and third arms, with an extended portion locking with another arm and/or a fixed component, thereby locking the assembly in the extended position and providing additional rigidity to the structure.

The assembly may comprise a fourth arm to support one or more components. In one preferred embodiment, the fourth arm is pivotably connected to the third arm, more preferably to the first position on the third arm, such that the fourth arm is pivotably connected to both the second and third arms. In an alternative embodiment, the fourth arm is pivotably connected to the second position on the third arm, such that the fourth arm is pivotably connected to both the first and third arms.

The fourth arm may be of any suitable length, as required by the duty it is to perform. In one preferred embodiment, the length of the fourth arm is equal to the length of the second arm and/or the first arm.

As described above, relative movement of the components of the assembly may be limited or restricted. Suitable means for limiting the relative movement of components of the assembly include a flexible tie or tether extending between two of the arms and connecting arm. One preferred form for the flexible tie comprises a plurality of hingedly connected arms or arm assemblies moveable between a folded condition when the assembly is in the retracted position and a fully extended condition in the extended position.

Alternatively, the movement of the assembly may be limited by components to which one or more arms of the assembly are connected. For example, the assembly may have an arm, for example the third arm, connected to a foldable assembly, which unfolds as the assembly moves from the retracted to the extended position and locks in the unfolded state, thereby locking the assembly in the extended position.

In one embodiment, the assembly is connected to a foldable assembly comprising a plurality of hingedly attached components, such as two hingedly attached components. For example, the foldable assembly may extend between a fixed point, such as one of the fixed pivots, for example the second fixed pivot, and the third arm. Alternatively, in embodiments in which the assembly comprises a fourth arm, the foldable assembly may extend between the aforementioned fixed point and the fourth arm.

In one embodiment, the foldable assembly is a floor assembly of a building or other structure comprising two or more floor panels. In another embodiment, the foldable assembly is a roof assembly of a building or other structure comprising two or more roof panels.

One or more of the hinged connections between the components of the foldable assembly may be linked to the third arm. The term 'linked' as used in this respect is a reference to the hinged connection being linked to the third arm such that the hinged connection moves along the third arm, preferably along a path that is generally parallel to the longitudinal axis of the third arm. Preferably, the hinged connection is pivotally connected to the third arm and moves along the third arm, more preferably generally along the longitudinal axis of the third arm.

In one preferred embodiment, the assembly comprises a guide with which the hinged connection is engaged and along which the hinged connection moves as the assembly moves between the retracted and extended positions. The guide may be spaced apart from but mounted to the third arm. More preferably, the guide is formed on the third arm. In one preferred embodiment, the guide comprises a guide channel, more preferably a guide channel extending generally longitudinally along the third arm. In one particularly preferred embodiment, the guide channel extends generally along the longitudinal axis of the third arm.

The path taken by the hinged connection when moving is generally arcuate. The form of the guide, for example the guide channel, is arranged to accommodate this arcuate movement of the hinged connection.

Depending upon the arrangement of the assembly, the foldable assembly may lock when the assembly is in the extended position, that is the assembly can no longer be retracted simply by reversing the direction of action of the force or forces applied to the driven arm of the assembly, in particular the first and second arms. This has the advantage of providing the extended assembly with increased rigidity and strength. To reverse the movement of the assembly, a reverse drive assembly may be provided. The reverse drive assembly is connected to one or more components of the foldable assembly and is operated to move the foldable assembly from the locked position, thereby allowing the assembly to be moved to the retracted position. In one embodiment, the reverse drive assembly comprises a cable connected to a component of the foldable assembly. The cable may extend over one or more pulleys arranged on the assembly, to allow the cable to be pulled by a suitable winch.

In a particularly preferred embodiment of the assembly of the present invention, the lengths of the arms are selected in accordance with the above criteria and to fold up when in the retracted position to lie between or adjacent the line joining the first and second fixed pivots. It is a particular advantage that the assembly can be arranged to be in such a compact form when in the retracted position. In a preferred embodiment, the arms are formed with portions having 'I' and 'L' shapes in cross-section, with the portions being arranged to allow the arms to be accommodated within one another when in the retracted position.

It is a further advantage of the assembly of present invention that it is highly scaleable and may be constructed and applied at a wide range of scales to convert motion, as described hereinbefore.

The assembly finds wide applications and uses, in particular by allowing relative movement between a first component and a second component.

Accordingly, in a further aspect, the present invention provides an expandable assembly comprising a first component and a second component, the first component being arranged for movement with respect to the second component, wherein an assembly as hereinbefore described is provided between the first component and second component, operation of the assembly providing movement of the first component with respect to the second component.

In the expandable assembly of this aspect of the invention, the first component provides both the first and second fixed pivots. The second component is an object to be moved relative to the first component and is connected to one or more of the arms of the assembly.

In many applications, a plurality of assemblies as hereinbefore described is employed in a single expandable assembly. In particular, a plurality of assemblies may be employed in a spaced apart relationship on opposing sides of an object to be moved.

As noted above, it is a particular advantage of the assembly of the present invention that the third arm may form, comprise or have mounted thereto a leg assembly, which is deployed as the assembly moves from the retracted position to the extended position.

In a further aspect, the present invention provides a building comprising:
  a first building portion and a second building portion, the
    first building portion being moveable relative to the
    second building portion between a retracted position
    and an extended position;
  wherein relative movement between the first and the
    second building portions and support of one of the first
    and second building portions with respect to the other
    of the first and second building portions are provided
    by an assembly as hereinbefore described.

The first building portion may be any structure or part of a building, in particular a fixed structure, such as a house, apartment or office building, or a mobile building structure, such as a mobile house, caravan or the like. The second building structure may be any structure or component of the installation that is required to be moved relative to the first building portion between the retracted and extended positions. Examples of such structures include walls, wall panels, balconies, floors, floor panels, floor extensions, roofs, roof panels, roof extensions, canopies and the like.

Embodiments of the assembly of the present invention will be described, by way of example only, by reference to the accompanying figures, in which.

Figure 1:
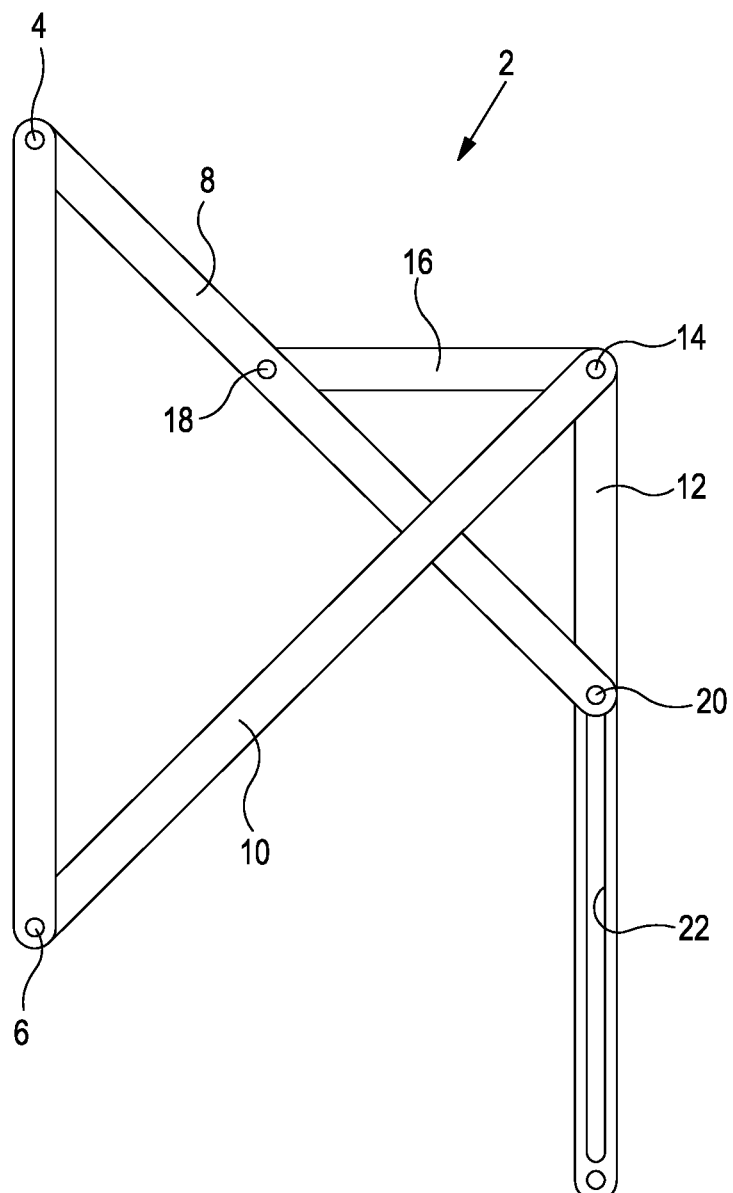
FIG. 1 shows a simplified diagrammatical representation of an assembly according to one embodiment of the present invention in an extended position.

Turning to FIG. 1, there is shown a diagrammatical representation of an assembly of one embodiment of the present invention, generally indicated as 2. The assembly 2 is shown mounted to a fixed structure at a first fixed pivot 4 and a second fixed pivot 6. The fixed pivots 4, 6 are spaced apart and are fixed in relation to one another. The fixed structure in FIG. 1 is represented by a fixed bar extending between the fixed pivots 4, 6. However, it is to be understood that the fixed structure may be any structure, assembly or component, such as a building or building component and the like.

A first arm 8 is pivotally connected at a first position at one end of the first arm to the first fixed pivot 4. A second arm 10 is pivotally connected at a first position at one end of the second arm to the second fixed pivot 6. A third arm 12 is mounted at one end by a pivot connection 14 at the second or distal end of the second arm 10.

A connecting arm 16 is mounted at one end by a pivot connection 18 to the first arm 8 at a second position on the first arm 8. The second end of the connecting arm is mounted by the pivot connection 14 to the third arm 12. In the embodiment shown in FIG. 1, the connecting arm 16 is connected to the second arm at the connection 14, such that the connecting arm 14 is connected to both the second arm 10 and to the third arm 12. This is a preferred arrangement. However, the connecting arm 16 may be pivotably connected to the second arm 10 at a position spaced from the connection 14 and between the fixed pivot 6 and the connection 14.

The pivot connections may be formed by any suitable means, for example by pins extending through holes in the arms being pivotally joined.

As shown in FIG. 1, the third arm 12 extends from the connection 14 about which it can pivot and is linked to the first arm 8 by a connection 20 at a third position on the first arm 8. In the embodiment shown in FIG. 1, the connection 20 is at the distal end of the first arm 8, that is the end furthest from the fixed pivot 4. Movement of the third arm 12 about the connection 14 is constrained by the movement of the connection 18, as the assembly moves between the retracted and extended positions.

In the extended position shown in FIG. 1, the third arm 12 extends parallel to the line joining the fixed pivots 4 and 6.

As noted above, the third arm 12 is linked to the first arm 8 by the connection 20. In the embodiment shown, the third arm 12 is provided with a guide channel 22 extending longitudinally along a major portion of the length of the third arm 8. In the arrangement shown, the pin of the connection 20 is slideable along the channel 22.

In operation, as the assembly 2 moves between the retracted and extended positions, the connection 18 moves along the guide channel 22, with the third arm 12 moving about the pivot connection 14.

Figure 2A:
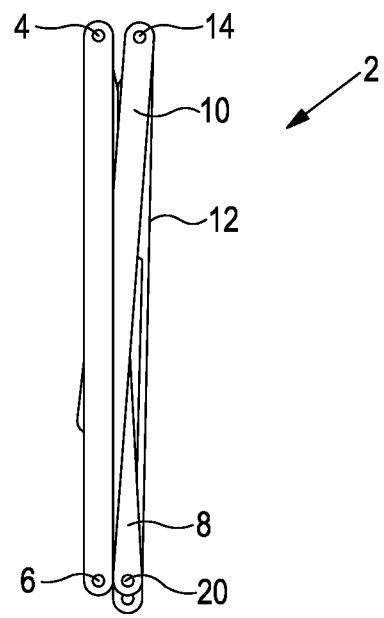
FIGS. 2a to 2d show the assembly of FIG. 1 in positions from a retracted position shown in FIG. 2a and a partially extended position shown in FIG. 2d.
Figure 2B:
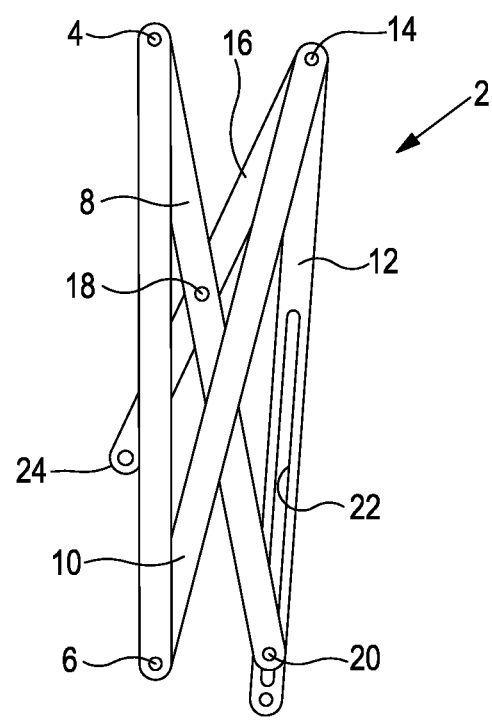
Figure 2C:
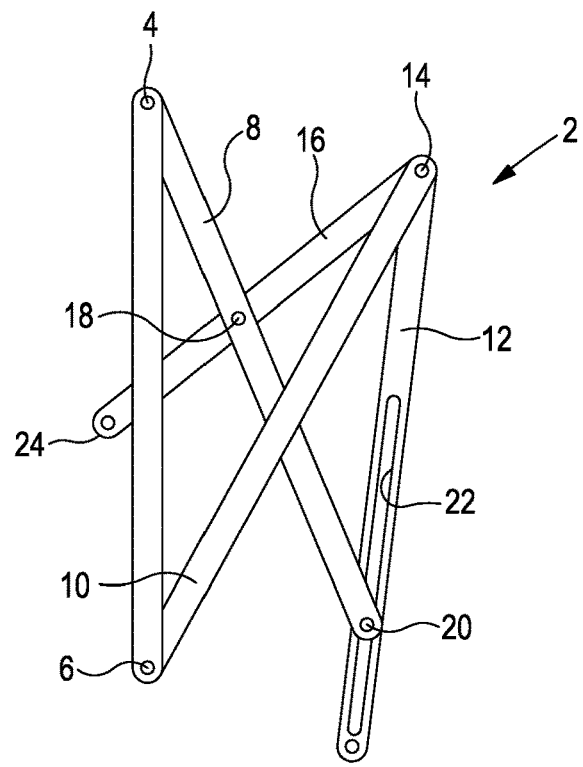
Figure 2D:
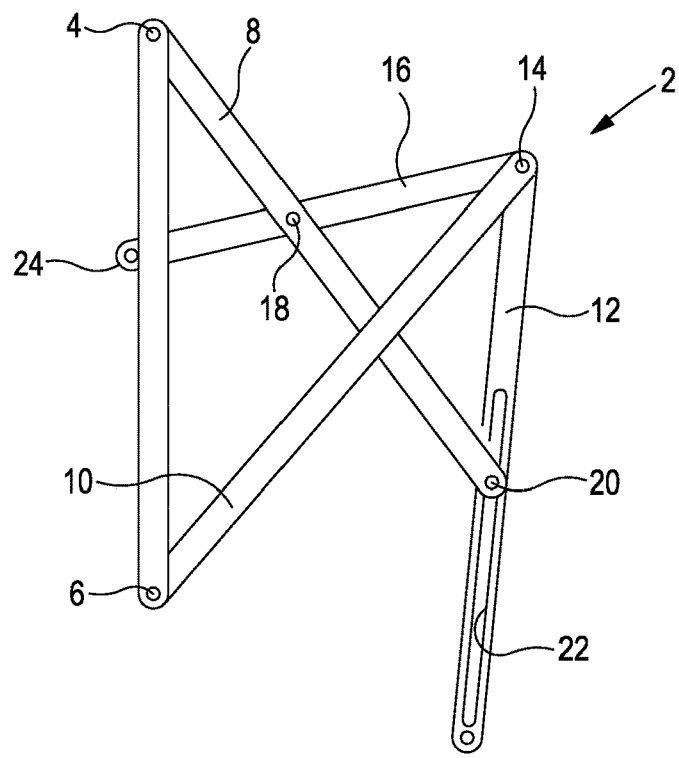

Turning now to FIGS. 2a to 2d, there is shown a sequence of drawings of the general assembly of FIG. 1 in positions between a retracted position, shown in FIG. 2a, and a partially extended position shown in FIG. 2d. The components of the assembly of FIGS. 2a to 2d have been identified using the same reference numerals as used in relation to FIG. 1 and discussed above.

In the assembly shown in FIGS. 2a to 2d, the connecting arm 16 extends beyond the connection 18 with the first arm 8. This allows the proximal end 24 of the connecting arm 16 to engage with a stop or locking mechanism (not shown for clarity) when in the extended position, to provide additional rigidity and strength to the assembly 2.

As can be seen, as the assembly 2 moves from the retracted position shown in FIG. 2a through the positions shown in FIGS. 2b to 2d to the extended position shown in FIG. 1, the connection 20 moves upwards (as viewed in the figures) along the channel 22 in the third arm 12, as the third arm 12 rotates about the connection 14 and descends (as viewed in the figures). In particular, the free end of the third arm 12 moves down and below (as viewed in the figures) the level of the fixed pivot 6.

Turning to FIGS. 3a to 3e, there is shown a further embodiment of the assembly of the present invention. The assembly shares many components with the assembly of FIGS. 1 and 2, as described above, which have been indicated using the same reference numerals.

In common with the assembly of FIG. 2, the connecting arm 16 extends beyond the pivot connection 18.

In the assembly shown in FIGS. 3a to 3e, the third arm 12 is provided with a channel as in FIG. 1 for the connection 20, to allow the first arm 8 to be linked to the third arm 12. However, in the arrangement of FIGS. 3a to 3e, the channel is formed in just one side of the third arm 12 and is not visible in FIGS. 3a to 3e.

To provide additional support, the assembly of FIGS. 3a to 3e comprises a fourth arm 30. The fourth arm 30 is pivotably connected at one end thereof to the pivot connection 14.

The floor assembly 40 extends between and is connected to each of the second fixed pivot 6 and the distal end of the fourth arm 30. The floor assembly 40 comprises two hingedly connected floor members 42a, 42b, with the first floor member 42a pivotably connected to the second fixed pivot 6 and the second floor member 42b pivotably connected to the end of the fourth arm 30.

The floor members 42a and 42b are pivotally connected at their adjacent ends, for example by a hinge connection 44. The third arm 12 is provided with a guide channel 46 extending longitudinally along the arm, along which the connection 44 is free to move. The movement of the connection 44 along the guide channel 46 can be seen in FIGS. 3a to 3e. As can be seen, the guide channel 46 is arcuate, to accommodate the curved path taken by the hinge connection 44 as the assembly moves between the retracted position shown in FIG. 3a and the extended position shown in FIG. 3e.

Figure 3A:
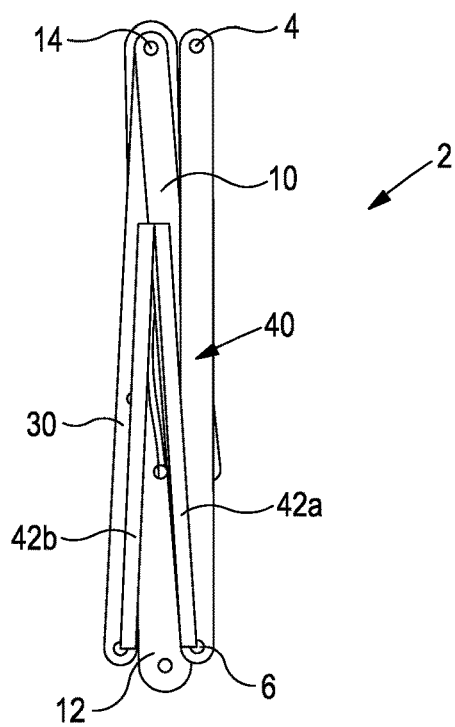
FIGS. 3a to 3e show an assembly of a further embodiment of the present invention in positions from a retracted position shown in FIG. 3a to an extended position shown in FIG. 3e.
Figure 3B:
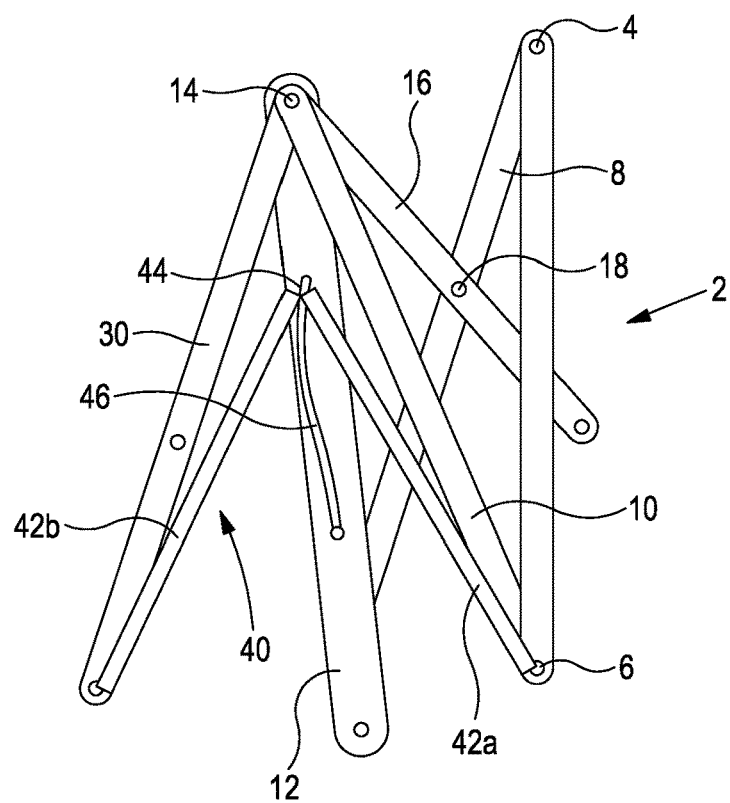
Figure 3C:
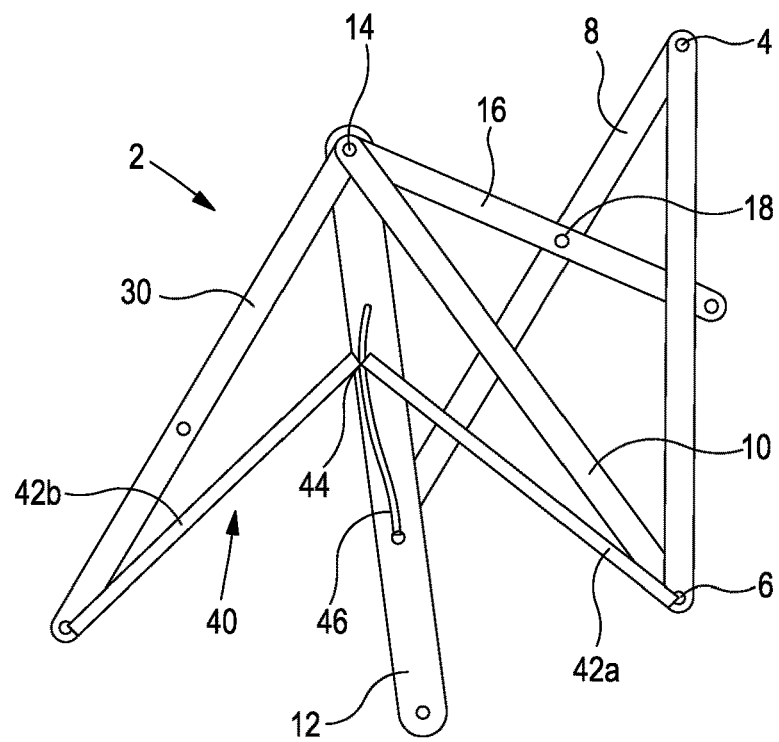
Figure 3D:
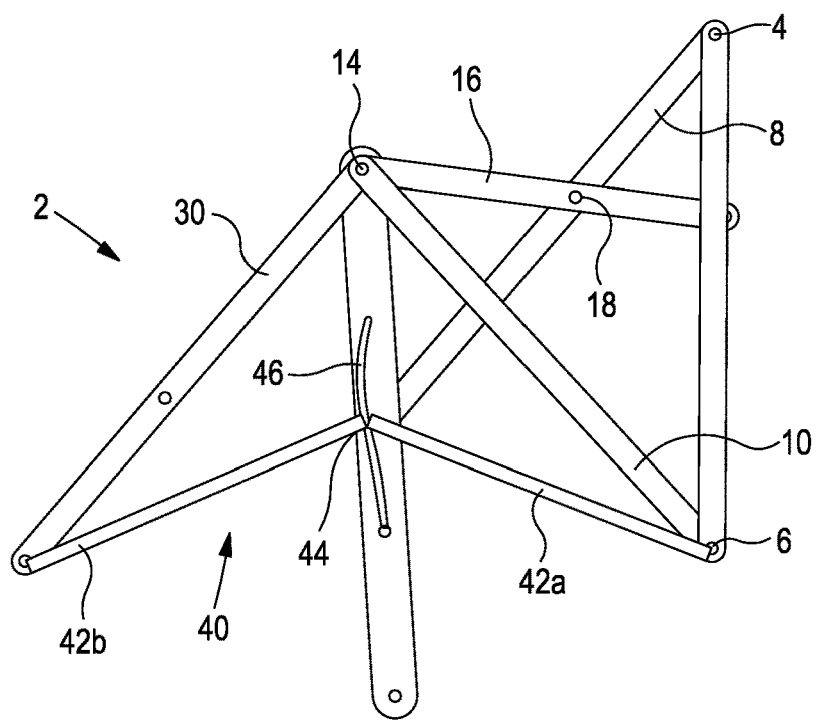
Figure 3E:
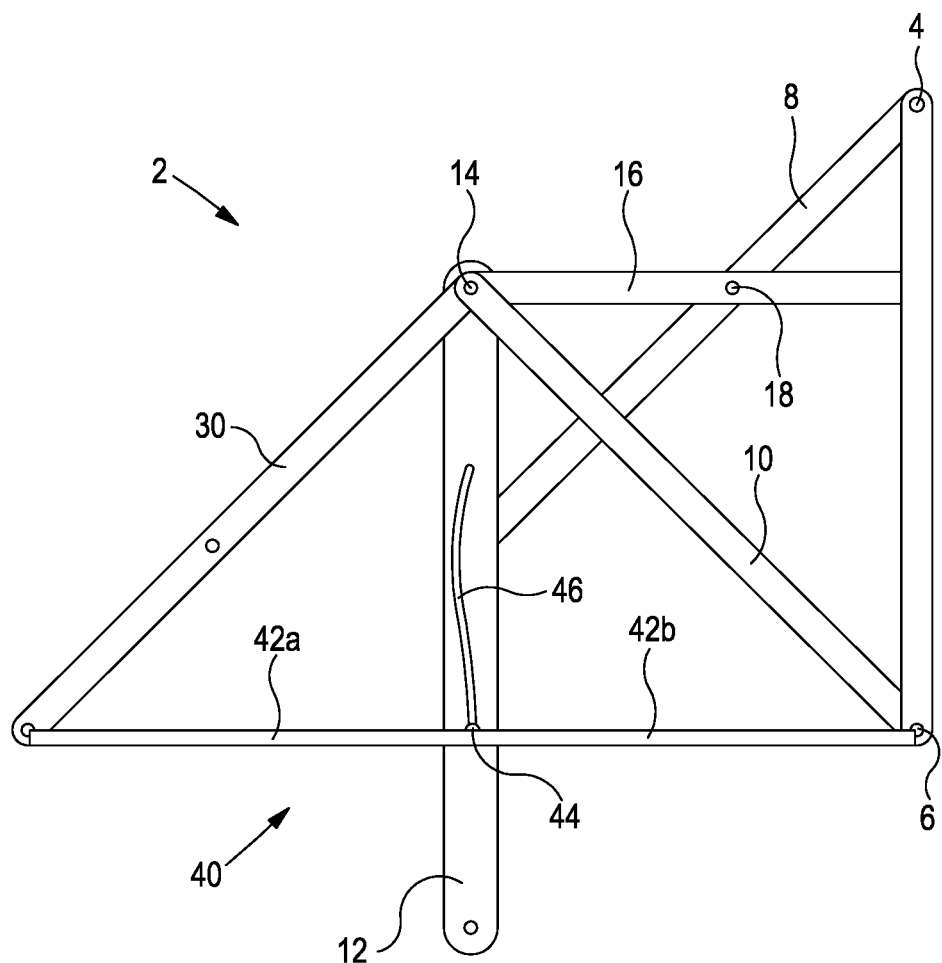

The assembly 2 is shown in FIGS. 3b to 3d in a partially extended position. As can be seen, in moving from the position shown in FIG. 3a to the extended position shown in FIG. 3e, the floor members 42a, 42b are unfolded and moved downwards (as viewed in the figures) into a horizontal position, as the assembly is moved towards the extended position.

The ends of the guide channel 46 act additionally to provide stops, to limit the movement of the floor members 42a, 42b and the assembly. In extended position, shown in FIG. 3e, the lower end (as viewed in the figure) of the guide channel 46 is holding the floor assembly in the horizontal position, with the third arm 12 supporting the central portion of the floor assembly.

In the embodiment of FIGS. 3a to 3e, the assembly 2 is supporting a floor assembly, generally indicated as 40, such as may be employed with an expandable building structure. However, it is to be understood that the assembly may support other components or structures in an analogous manner.

Turning to FIGS. 4a to 4e, there is shown a further alternative embodiment to the arrangement of FIG. 1. Components common to the arrangements of FIGS. 1 and 4a to 4e are indicated using the same reference numerals, as described above. Arms of the assembly of FIGS. 4a to 4e each comprise two arm components connected in the same general manner as in the assembly of FIG. 1 and described in more detail below.

In the assembly of FIGS. 4a to 4e, the first arm 8 comprises two first arm components 8a and 8b, spaced apart and parallel to one another. The second arm 10 similarly comprises two spaced apart, parallel arm components 10a and 10b.

The third arm 12 comprises two spaced apart, parallel arm components 12a, 12b. The third arm 12 further comprises a slidable arm component 12c arranged between the two spaced apart arm components 12a, 12b and slidable longitudinally along the two arm components.

The connecting arm 16 comprises two spaced apart, parallel arm components 16a and 16b.

Each of the arm components 16a, 16b of the connecting arm 16 is pivotally connected to the corresponding arm components 8a, 8b of the first arm 8 at a respective connection 18. Each of the arm components 16a, 16b of the connecting arm 16 is pivotally connected to the corresponding arm components 10a, 10b of the first arm 10 and the arm components 12a, 12b of the third arm 12 at a respective connection 14.

Each of the arm components 8a, 8b of the first arm 8 is linked to the corresponding arm components 12a, 12b of the third arm 12 at a respective connection 20 to a respective slider 50, slidable along a longitudinal guide channel 22 in the respective arm component 12a, 12b.

In operation, the assembly of FIGS. 4a to 4e performs in the same manner as the assembly of FIG. 1 described above.

The assembly of FIGS. 4a to 4e further comprises an actuating arm 60, having a first end pivotally connected to the second fixed pivot 6 and a second end pivotally connected to the slidable arm component 12c of the third arm.

Figure 4A:
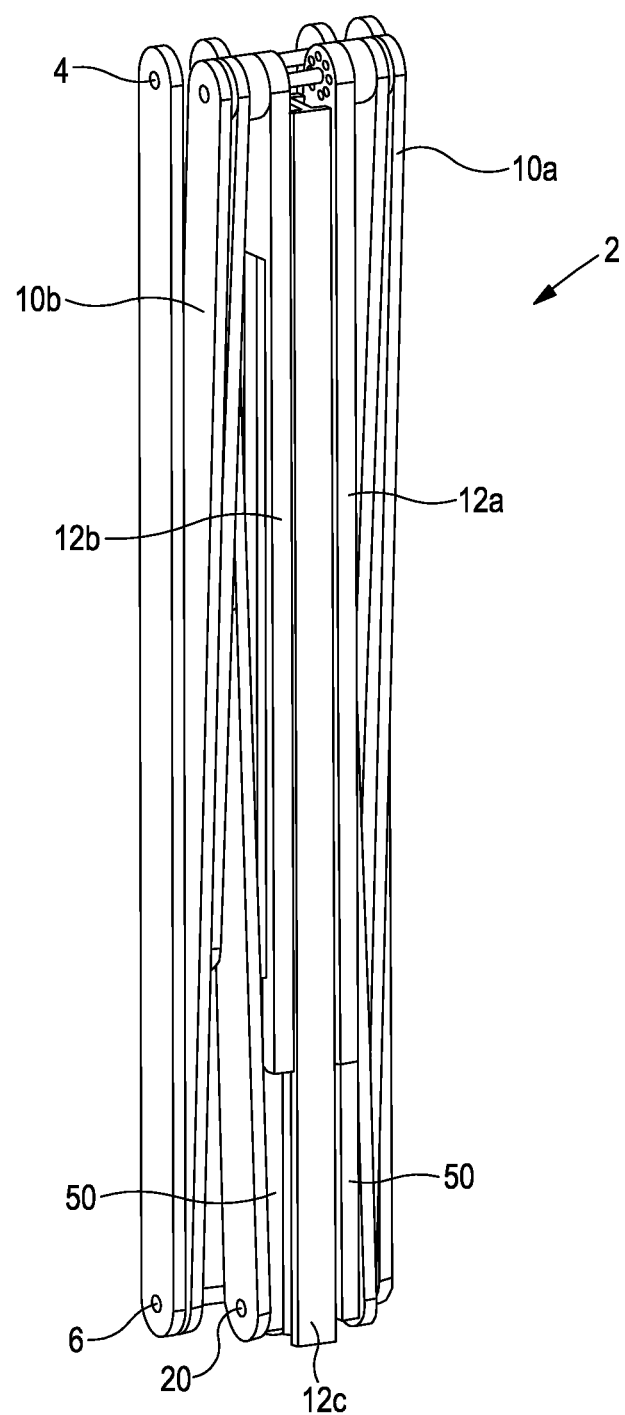
FIGS. 4a to 4e show an assembly according to a still further embodiment of the present invention in positions from a retracted position shown in FIG. 4a to an extended position shown in FIG. 4e.
Figure 4B:
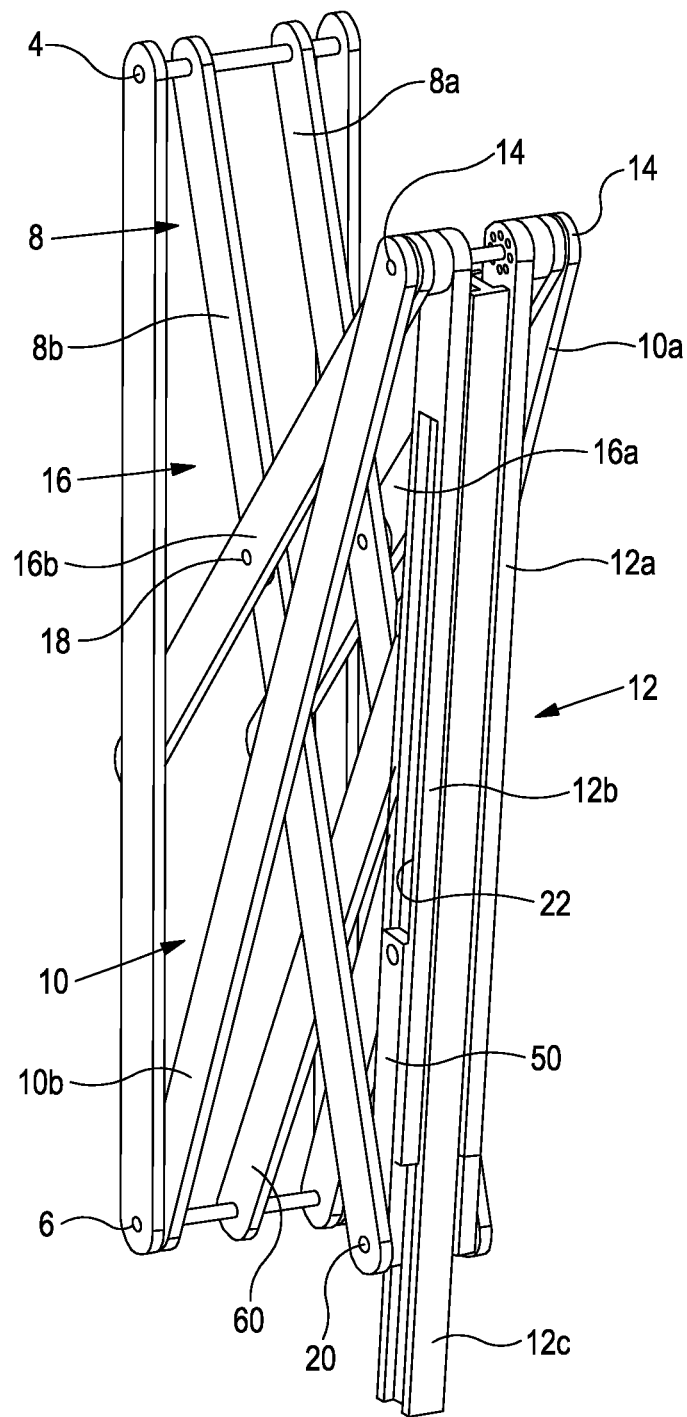
Figure 4C:
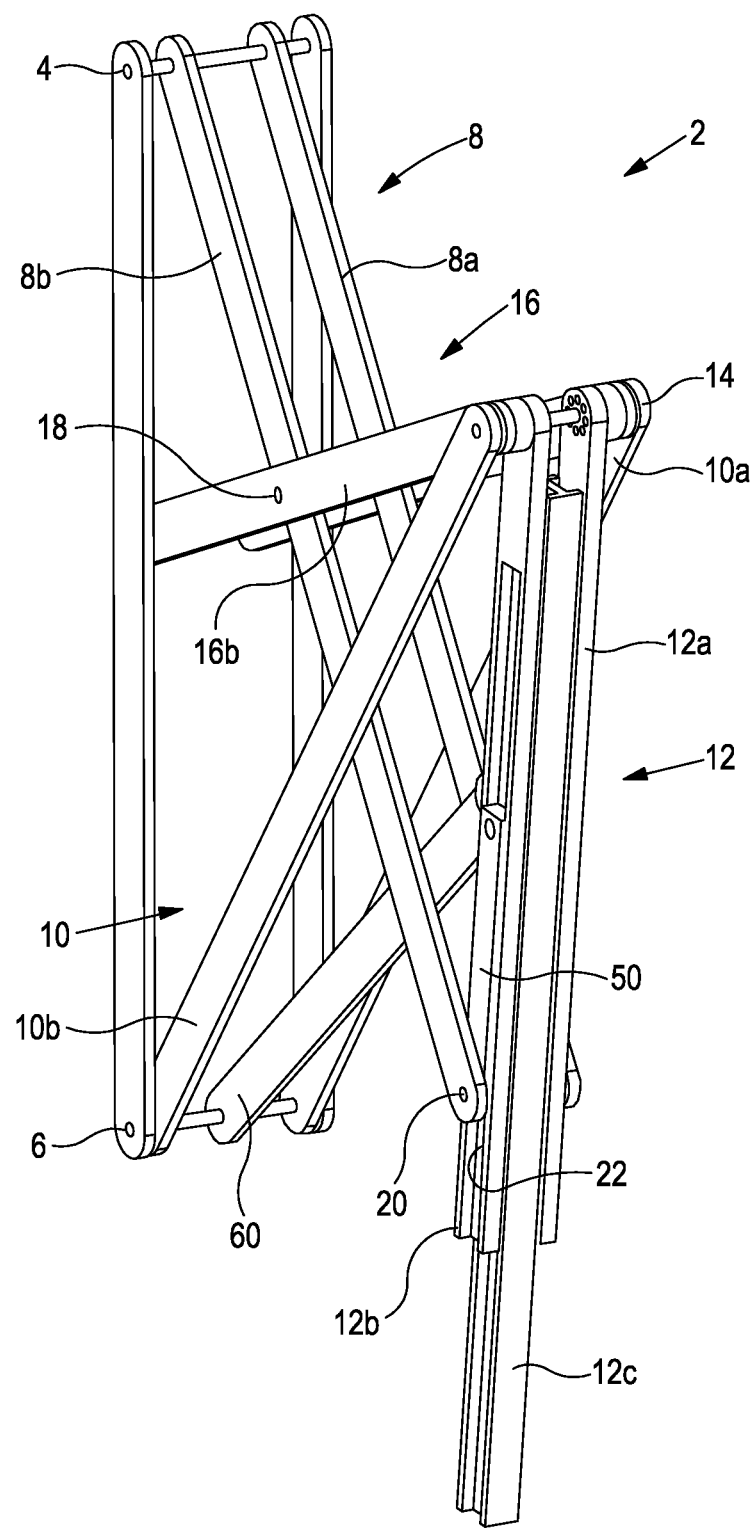
Figure 4D:
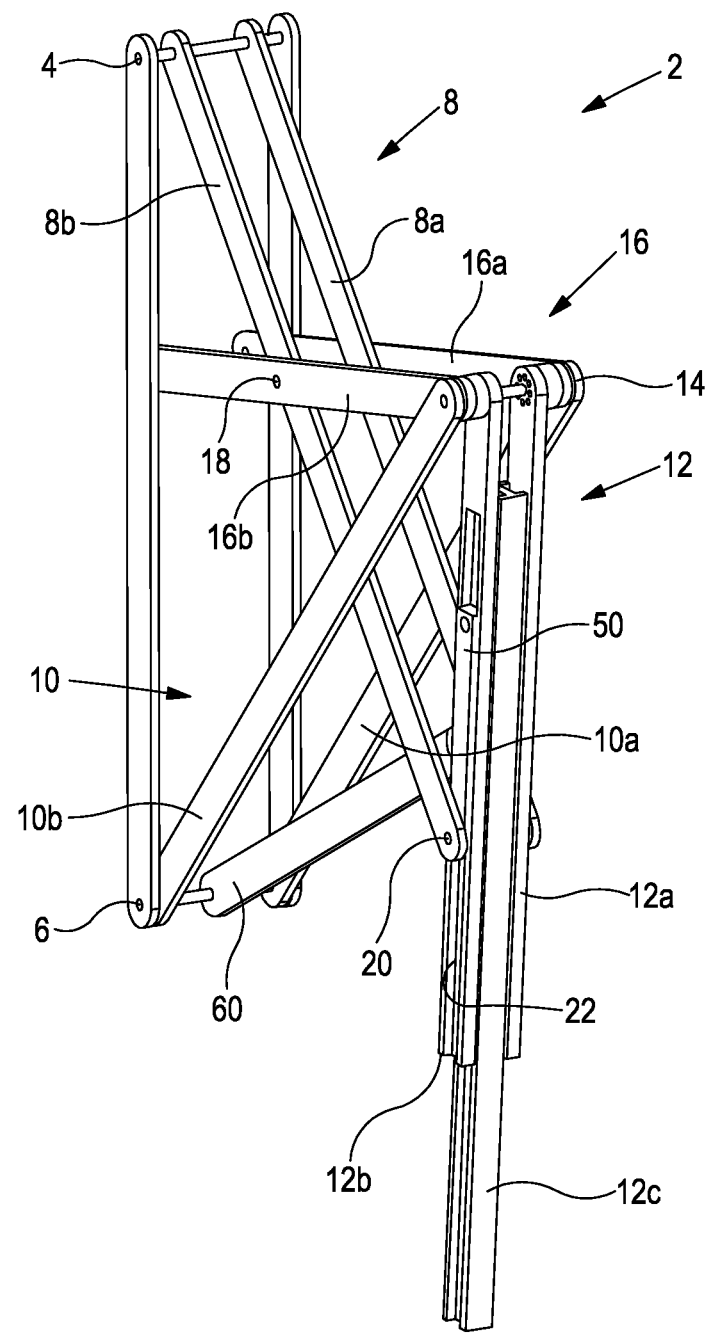
Figure 4E:
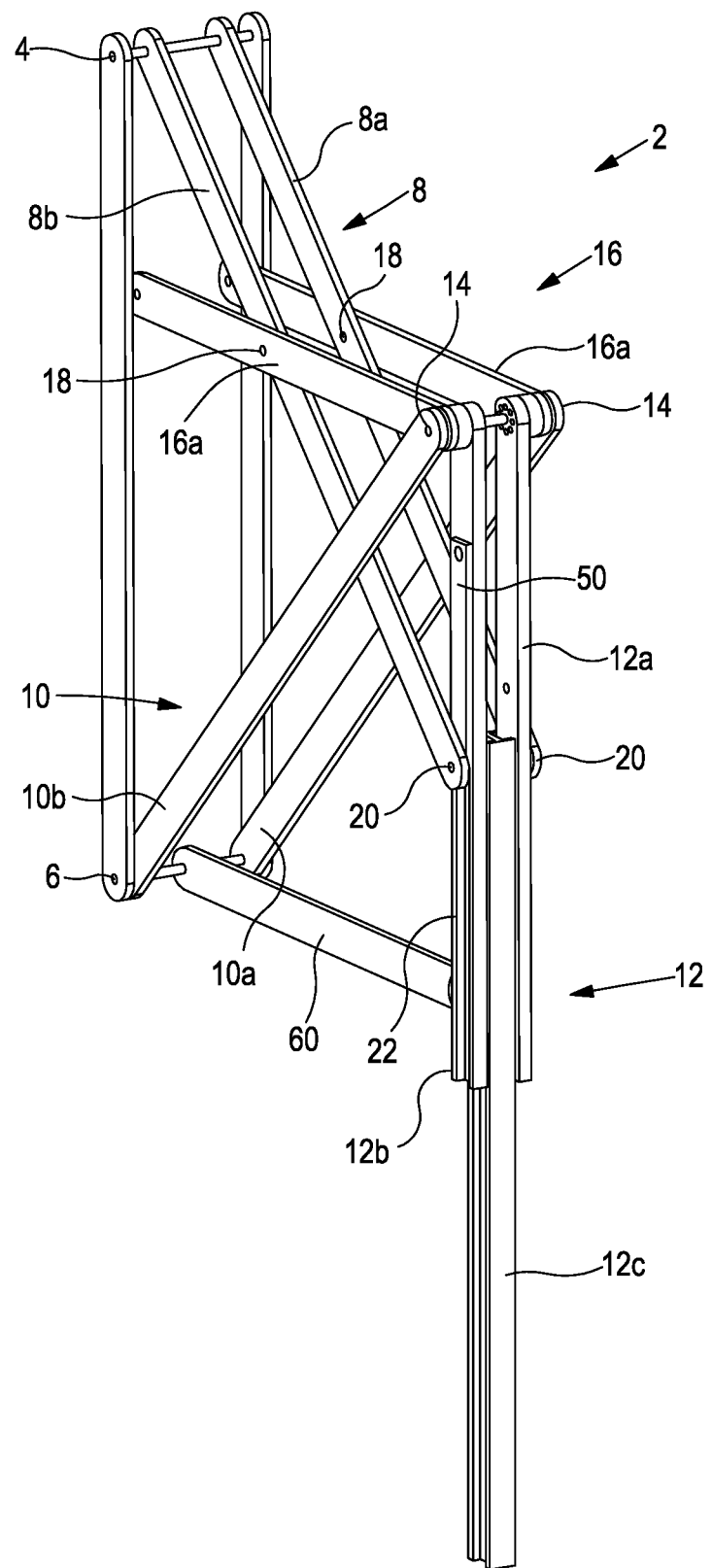

In operation, as the assembly is moved from the retracted position shown in FIG. 4a to the extended position shown in FIG. 4e, the actuating arm 60 pivots about the second fixed pivot 6 and acts to move the slidable arm component 12c longitudinally along the third arm 12. In particular, the slidable arm component 12c is moved downwards, as viewed in FIGS. 4a to 4e. In this way, the third arm is deployed and extended as the assembly is moved to the extended position. When the assembly moves in the reverse direction to the retracted position of FIG. 4a, the slidable arm component 12c is retracted or raised (as viewed in the figures) by the actuating arm.

In the embodiments shown in the figures and described above, the first position on the third arm is fixed relative to the third arm, while the second position on the third arm is moveable with respect to the third arm. In these embodiments, the third arm is moved and/or extended downwards, as viewed in the figures. The assembly may be constructed and operated in an analogous manner by having the second position on the third arm fixed relative to the third arm, while the first position on the third arm is moveable with respect to the third arm. In this arrangement, the third arm moves and/or extends in the opposite direction to that shown in the accompanying figures.

The invention claimed is:

1. An assembly for converting motion, the assembly movable between a retracted position and an extended position, the assembly comprising:
 a first arm rotatable at a first position on the first arm about a first fixed pivot;
 a second arm rotatable at a first position on the second arm about a second fixed pivot, the second fixed pivot spaced apart from the first fixed pivot, the first fixed pivot and the second fixed pivot being joined by a line;
 a third arm linked at a first position on the third arm to the second arm at a second position on the second arm, the second position on the second arm spaced apart from the first position on the second arm, the third arm being linked at a second position on the third arm to the first arm at a second position on the first arm, the second position on the first arm spaced apart from the first position on the first arm, wherein one of the first and second positions on the third arm is moveable relative to the third arm and the other of the first and second positions on the third arm is fixed relative to the third arm; and
 a connecting arm extending between the first arm and the second arm, the connecting arm pivotably connected at a first position on the connecting arm to a third position on the first arm spaced apart from the first and second positions on the first arm and pivotably connected at a second position on the connecting arm to the second position on the second arm;
 wherein the first arm crosses the second arm.

2. The assembly according to claim 1, wherein the first and second fixed pivots are arranged on a vertical straight line.

3. The assembly according to claim 1, wherein the arms of the assembly are arranged to lie and move to one side of the line joining the first and second fixed pivots.

4. The assembly according to claim 1, wherein the moveable one of the first and second positions on the third arm both pivots in relation to the third arm and moves along a straight line parallel to the longitudinal axis of the third arm.

5. The assembly according to claim 4, wherein the moveable one of the first and second positions on the third arm moves along the longitudinal axis of the third arm.

6. The assembly according to claim 1, further comprising a guide connected to the third arm and with which the second position on either the first arm or the second arm is engaged and along which the second position on the first or second arm travels as the assembly moves between the retracted and extended positions.

7. The assembly according to claim 6, wherein the guide is formed on the third arm.

8. The assembly according to claim 7, wherein the guide comprises a guide channel extending longitudinally along the third arm.

9. The assembly according to claim 1, wherein the connecting arm extends beyond the connection with the first arm towards the line joining the first and second fixed pivots.

10. The assembly according to claim 9, wherein the end of the connecting arm is arranged to engage with the structure providing the first and second fixed pivots.

11. The assembly according to claim 1, wherein the length of the third arm increases as the assembly moves from the retracted position to the extended position.

12. The assembly according to claim 1, further comprising a fourth arm, wherein the fourth arm is pivotably connected to the third arm at the first position on the third arm or at the second position on the third arm.

13. The assembly according to claim 1, further comprising a foldable assembly to limit relative movement of the components of the assembly, wherein the foldable assembly comprises a plurality of hingedly connected arms or components.

14. The assembly according to claim 13, wherein the hingedly connected arms or components are connected by a hinged connection linked to the third arm and moveable along the third arm.

15. The assembly according to claim 14, wherein the hinged connection is engaged with and moves along a guide channel formed on or in the third arm.

16. The assembly according to claim 13, wherein the foldable assembly locks when the assembly is in the extended position.

17. The assembly according to claim 16, further comprising a reverse drive assembly connected to one or more arms or components of the foldable assembly.

18. An expandable assembly comprising a first component and a second component, the first component being arranged for movement with respect to the second component, wherein an assembly according to claim 1 is provided between the first component and second component, operation of the assembly providing movement of the first component with respect to the second component.

19. The expandable assembly according to claim 18, wherein the expandable assembly is a building and the first and second components are building components.

20. The expandable assembly according to claim 18, wherein the third arm of one or more of the assemblies forms a leg to support the second component in the extended position.

* * * * *

UNITED STATES PATENT AND TRADEMARK OFFICE
CERTIFICATE OF CORRECTION

| | |
|---|---|
| PATENT NO. | : 11,713,798 B2 |
| APPLICATION NO. | : 17/558229 |
| DATED | : August 1, 2023 |
| INVENTOR(S) | : Martyn |

It is certified that error appears in the above-identified patent and that said Letters Patent is hereby corrected as shown below:

On the Title Page
Item (73) Assignee, Please change "Ten Fold Engineering Limited, Buckinghamshire (GB)" to
--Konrad Prefab LLC, Vermont, US--.

Signed and Sealed this
Fourteenth Day of November, 2023

Katherine Kelly Vidal
*Director of the United States Patent and Trademark Office*